United States Patent [19]

Shii et al.

[11] Patent Number: 4,769,281

[45] Date of Patent: Sep. 6, 1988

[54] MAGNETIC RECORDING MEDIUM AND METHOD OF MANUFACTURING THE SAME

[75] Inventors: Hikaru Shii; Yasuhiro Kanaya, both of Tokyo; Takuya Nishimoto, Yokohama, all of Japan

[73] Assignee: The Furukawa Electric Co., Ltd., Tokyo, Japan

[21] Appl. No.: 36,791

[22] Filed: Apr. 10, 1987

[30] Foreign Application Priority Data

| | | |
|---|---|---|
| Apr. 15, 1986 [JP] | Japan | 61-84966 |
| Jun. 2, 1986 [JP] | Japan | 61-127644 |
| Sep. 17, 1986 [JP] | Japan | 61-217216 |
| Sep. 29, 1986 [JP] | Japan | 61-227988 |
| Oct. 3, 1986 [JP] | Japan | 61-234459 |

[51] Int. Cl.$^4$ .............................................. G11B 5/72
[52] U.S. Cl. ....................................... 428/336; 427/41; 427/128; 427/131; 427/132; 428/457; 428/694; 428/695; 428/900
[58] Field of Search ................. 427/131, 132, 128, 41, 427/44; 428/695, 694, 900, 457, 336; 360/134–136

[56] References Cited

U.S. PATENT DOCUMENTS

| | | | |
|---|---|---|---|
| 4,390,601 | 6/1983 | Ono | 427/131 |
| 4,429,024 | 1/1984 | Ueno | 427/131 |
| 4,552,820 | 11/1985 | Lin et al. | 428/611 |
| 4,554,217 | 11/1985 | Grimm et al. | 428/900 |
| 4,582,746 | 4/1986 | Shirahata | 428/336 |
| 4,601,950 | 7/1986 | Iida | 428/694 |
| 4,693,799 | 9/1987 | Yanagihara | 427/424 |
| 4,693,927 | 9/1987 | Nishikawa | 427/131 |

FOREIGN PATENT DOCUMENTS 0121526 6/1985 Japan ................................ 427/131

OTHER PUBLICATIONS

EE Transactions on Magnetics, vol. MAG-21, No. 5, Sep. 1985, Structure and Morphology of RF Sputtered Carbon Overlayer.

Films, Shashi Agarwal, Journal of Applied Polymer Science, vol. 26, 3707–3718 (1981) Plasma Polymerized Protective Films for Plated Magnetic Disks, Katsuhiro Harada.

Primary Examiner—Ellis P. Robinson
Attorney, Agent, or Firm—Frishauf, Holtz, Goodman & Woodward

[57] ABSTRACT

This invention relates to a magnetic recording medium in which a protective film prepared by plasma polymerization of an organic compound such as dibenzyl or diphenyl which exhibits a solid phase at room temperature and under atmospheric pressure is formed on a thin ferro-magnetic film. This invention also relates to a method of manufacturing the magnetic recording medium. The protective film has a high wear resistance and excellent anti-corrosion properties.

10 Claims, 2 Drawing Sheets

MAGNETIC RECORDING MEDIUM AND METHOD OF MANUFACTURING THE SAME

BACKGROUND OF THE INVENTION

The present invention relates to a magnetic recording medium in which a protective film is formed on a thin ferro-magnetic film and a method of manufacturing the same and, more particularly, to an improvement of a protective film and a method of manufacturing the same.

DESCRIPTION OF THE PRIOR ART

Conventionally, a magnetic recording medium having a thin ferro-magnetic film as a magnetic recording layer is prepared as follows. A ferro-magnetic metal material, e.g., —$Fe_2O_3$ fine particles and/or fine particles of Ba-ferrite, is dispersed in a resin matrix, e.g., an epoxy resin or polyurethane resin, to prepare an emulsion. The emulsion is coated on a substrate to form a thin ferro-magnetic film. Alternatively, a ferro-magnetic metal material, e.g., a Co based alloy, is deposited on a non-magnetic disk substrate plated with an Ni-p alloy or a plastic tape base by plating, vacuum deposition, sputtering, or the like, forming a thin ferro-magnetic metal film.

However, the former type of thin ferro-magnetic metal film has poor high-density recording characteristics. The latter type of thin ferro-magnetic metal film has excellent high-density recording characteristic. However, it is easily worn or damaged by contact of a head, and easily oxidized and corroded in air. Consequently, its recording characteristic is degraded.

For this reason, as a conventional protective film of the recording layer, a thin carbon film such as a sputtered carbon film, evaporated carbon film, or the like, prepared by the PVD method, is often used. The thin carbon film, however, has a so-called "island structure", and includes a large number of interfaces. This often induces poor anti-corrosion properties of the recording film or poor wear-resistance thereof over a long period of use. Thus, problems in durability and reliability are posed.

Recently, a protective thin film of polymer material is formed by plasma polymerization. However, when a polymerized film obtained by plasma polymerization is formed as a protective film, a material which exhibits a liquid or gas phase at room temperature and under atmospheric pressure is used as a monomer, and a resultant film is too soft to be used as a protective film. Therefore, as is apparent from the results of the CSS (Contact Start and Stop) test, there cannot be obtained the film of sufficient durability and wear resistance.

SUMMARY OF THE INVENTION

It is an object of the present invention to improve the properties of the conventional protective film, and to provide a magnetic recording medium, having high durability, high wear resistance, and excellent anti-corrosion properties; wherein a magnetic recording layer consisting of a thin ferro-magnetic metal film is formed on a substrate, and a protective film consisting of a polymerized film, which is prepared by plasma-polymerizing a sublimating organic compound exhibiting a solid phase at room temperature and at atmospheric pressure, is formed on the surface of the magnetic recording layer.

It is another object of the present invention to provide a method of manufacturing a magnetic recording medium, wherein characteristics of a protective film can be improved and excellent protective film can be efficiently formed.

A protective film according to the present invention can be particularly suited for a magnetic disk but can be applied to various other magnetic recording media such as a magnetic tape, a floppy disk, a magnetic card, and the like.

BRIEF DESCRIPTION OF THE DRAWINGS

FIGS. 1 and 2 are schematic diagrams for explaining examples of manufacturing a magnetic recording medium according to the present invention, in which FIG. 1 is a diagram for explaining a case wherein a sublimating organic compound is evaporated inside a reaction chamber, and FIG. 2 is a diagram for explaining a case wherein an evaporated sublimating organic compound is introduced into the reaction chamber from the outside.

Figure 1:
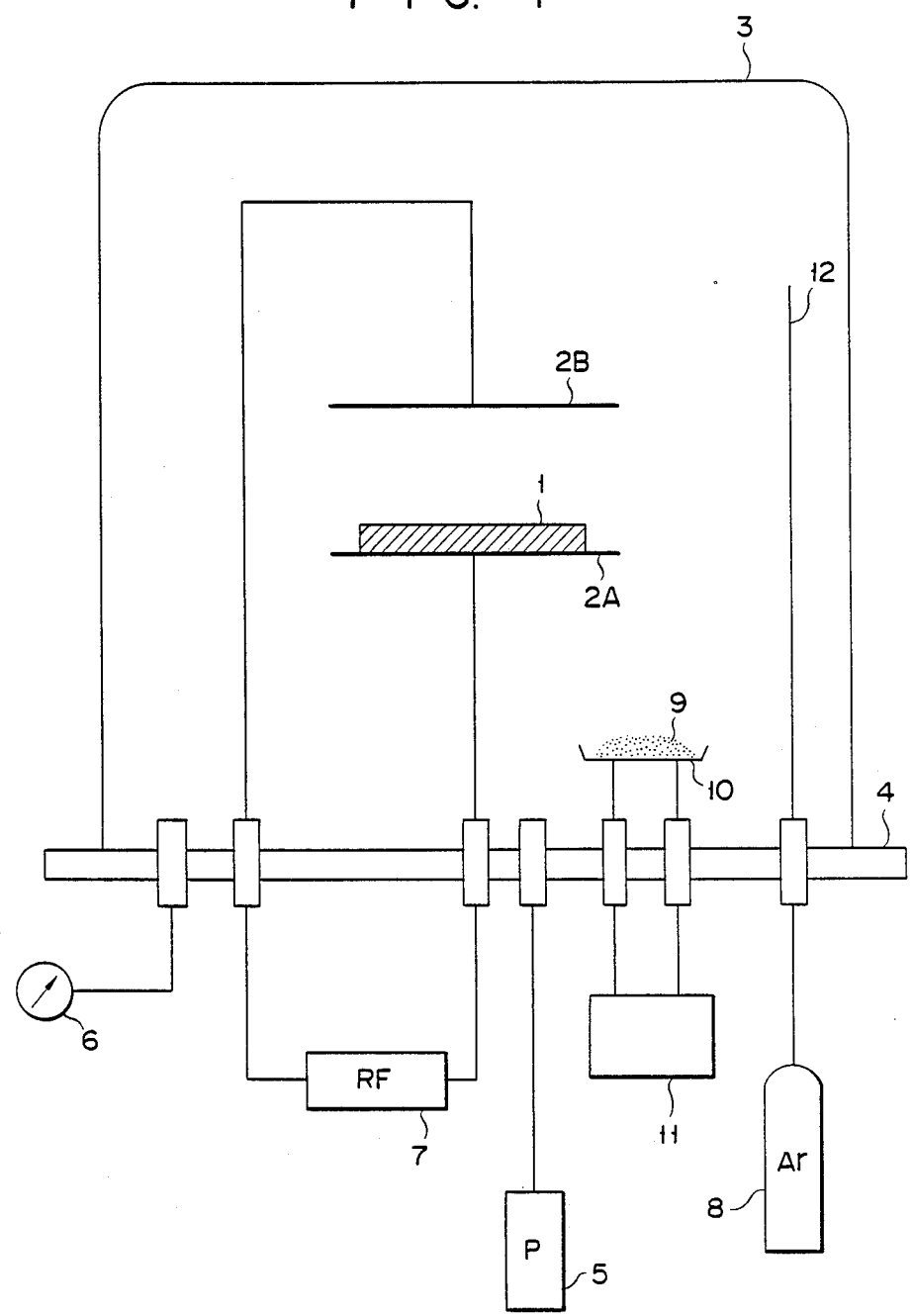

DETAILED DESCRIPTION OF THE INVENTION AND PREFERRED EMBODIMENTS (1) Description of the Invention and Embodiments Associated with Magnetic Recording Medium In a magnetic recording medium of the present invention in which a thin ferro-magnetic metal film serving as a magnetic recording layer is formed on a substrate, a sublimating organic compound which exhibits a solid phase at room temperature and under atmospheric pressure is evaporated and a protective film is formed on the surface of the thin ferro-magnetic metal film by plasma polymerization of the evaporated sublimating organic compound.

Examples of the sublimating organic compound which exhibits a solid phase at room temperature and under atmospheric pressure, are: an aromatic hydrocarbon such as naphthalene, antracene, tetracene, pentacene, hexacene, perylene, phenanthrene, chrysene, triphenylene, pyrene, benzopyrene, violanthrene, furonene, or ovalene; a derivative thereof; an aliphatic-aromatic hydrocarbon such as diphenyl, diphenylmethane, dibenzyl, triphenylmethane, or terphenyl; a single derivative thereof; and a derivative mixture thereof. In particular, dibenzyl and diphenyl are preferable since they can be rapidly sublimated and have a high vapor pressure upon melting.

A preferred protective film in the magnetic recording medium of the present invention will be described below. In a protective film consisting of a polymerized film which is prepared by plasma polymerization using dibenzyl or diphenyl as the sublimating organic compound, a ratio (H/C) of the number of hydrogen atoms to the number of carbon atoms falls within the range of 0.8 to 1.2, and its film thickness falls within the range of 50 to 600 Å.

The reason why the sublimating organic compound which exhibits a solid phase at room temperature and under atmospheric pressure is used as a material for preparing a protective film of the present invention by plasma polymerization is that the characteristics of a polymerized film are much superior to those of organic compounds which exhibit a liquid or gas phase at room temperature and under atmospheric pressure.

More specifically, the protective film of the present invention prepared by plasma polymerization has a small wear coefficient, and has excellent wear-resistance and durability, such that if there is frequently in contact with a magnetic head, its surface is not easily damaged.

The reason why the film thickness of the protective film by plasma polymerization preferably falls within the range of 50 to 600 Å is as follows. If the film thickness is below 50 Å, the resultant film has a poor wear resistance. If the film thickness exceeds 600 Å, a spacing loss is increased, and read out characteristics of recorded information are badly influenced.

The present invention can be suited for a magnetic disk but can also be applied to various other magnetic recording media such as a magnetic tape, a floppy disk, a magnetic card, and the like.

When the present invention is applied to a magnetic disk, the magnetic disk is prepared as follows. A chemical plating under layer such as an Ni-P layer is formed on an aluminum substrate and the under layer surface is subjected to post-treatment such as polishing. Thereafter, a thin ferro-magnetic metal film such as Co base alloy is formed on the surface of the under layer by a physical or chemical technique. The resultant magnetic disk is set on an opposing electrode type plasma polymerization apparatus, as shown in FIG. 1.

In FIG. 1, reference numeral 1 denotes a magnetic disk body wherein the thin ferro-magnetic metal film is formed on the substrate surface; 2A and 2B, opposing electrodes; 3, a bell jar; 4, a table; 5, a vacuum pump for evacuating the interior of bell jar 3; 6, an absolute vacuum gauge; 7, an RF power source connected to electrodes 2A and 2B; 8, a carrier gas source; 9, a sublimating solid organic compound; 10, a resistance heater for sublimating solid organic compound 9; 11, a power source connected to resistance heater 10; and 12, a nozzle for introducing a carrier gas into bell jar 3. A plasma generation apparatus used herein is not only limited to the one illustrated in FIG. 1 but can be any reaction system comprising an RF oscillation apparatus of, e.g., an induction coil type, a waveguide tube type, or the like.

In the apparatus described above, sublimating solid organic compound 9 is placed on resistance heater 10, and a voltage is applied to heater 10 to sublimate the organic compound. Then, plasma polymerization is performed using the sublimated organic compound to form the protective film concerning the present invention on the thin ferro-magnetic metal film.

In the present invention, the sublimating organic compound is used as one which exhibits a solid phase at room temperature and under atmospheric pressure, as described above.

One or a mixture of these organic compounds is placed in the presence of an inert carrier gas such as argon, helium, or nitrogen, and plasma polymerization is performed.

When plasma polymerization is performed using RF power, an energy density is maintained to fall within range of 0.2 to 4 W/cm$^2$ and, more preferably, 0.5 to 3 W/cm$^2$. and an output from the RF power source is to fall within the range of 30 to 500 W and more preferably 100 to 450 W, in accordance with the relationship between the RF power and a total electrode area. Thus, plasma polymerization is performed under as high power as possible, so that a hard protective film can be obtained. Note that the RF power source normally has an oscillation frequency of 13.56 MHz. The present invention is not limited to this frequency. Any frequencies varying from a DC wave to a microwave can be used.

The pressure inside the bell jar preferably falls within the range of 0.005 Torr to 3 Torr and, more preferably, 0.01 to 1.5 Torr. A reaction time preferably falls within the range of 5 seconds to 10 minutes and, more preferably, 10 seconds to 3 minutes although it is influenced by the type of monomer, a sublimation rate, and arrangement of electrodes, and the like, thus obtaining a protective film having a desired film thickness.

The thickness distribution of the obtained protective film normally falls within the range of 10 to 1,000 Å and, more preferably, 50 to 600 Å.

The present invention will be described by way of examples.

A protective film concerning the present invention was formed on the surface of a 5" magnetic disk body on which a thin ferro-magnetic metal film was formed by the plasma polymerization method in the presence of diphenyl ($C_6H_5C_6H_5$) or dibenzyl ($C_6H_5CH_2CH_2C_6H_5$) as a sublimating solid organic compound, using the opposing electrode type plasma polymerization apparatus shown in FIG. 1.

More specifically, stainless electrodes having a diameter of 130 mm were used and were separately held at a distance of 25 mm. A frequency of the RF power source was set at 13.56 MHz, and power was set at 100 or 200 W. Twelve milligrams of diphenyl having a melting point of 70° C. or dibenzyl having a melting point of 52° C. were placed on a tungsten boat as a monomer, and were sublimated upon application of a voltage of 5 V.

As a carrier gas, pure argon gas or pure nitrogen gas was used, and a inside pressure of the bell jar was set at 0.1 Torr. And any positive heating was not given to the said magnetic disk.

In this manner protective films concerning the present invention having various film thicknesses were obtained upon changing reaction time. Table 1 shows manufacturing conditions and obtained film thicknesses of the protective films.

The film thicknesses of these protective films were measured using a probe type film thickness gauge. The surfaces of the films were observed using an electron microscope, resulting the protective films had uniform surfaces without any pin holes. The CSS cycles of the resultant magnetic disks were tested using a CSS tester. Table 1 also shows these test results.

For the sake of comparison with the protective films concerning the present invention, the CSS test was conducted for magnetic disks (Comparative Examples) on which hydrocarbon protective films were respectively formed by plasma polymerization following the same procedures as in the films concerning the present invention using ethylene (Comparative Example No. 1) and stylene (Comparative Example No. 2). Table 1 also shows these test results.

Note that a ratio (H/C) of the number of hydrogen atoms to the number of carbon atoms of the protective films by plasma polymerization of Sample Nos. 1 to 7 was also measured. As a result, the ratio fell within the range of 0.8 to 1.2.

TABLE 1

| Sample No. | Manufacturing Conditions | | | | Thickness of Plasma-Polymerized Protective Film (Å) | CSS Resistance (cycle) |
| --- | --- | --- | --- | --- | --- | --- |
| | Sublimating Organic Compound | Power (W) | Reaction Time (sec) | Carrier Gas | | |
| Examples | | | | | | |
| (1) | Diphenyl | 100 | 20 | Pure Ar gas | 50 | $1 \times 10^4$ |
| (2) | Diphenyl | 100 | 60 | Pure Ar gas | 150 | $5 \times 10^4$ |
| (3) | Diphenyl | 100 | 180 | Pure Ar gas | 250 | $5 \times 10^4$ |
| (4) | Diphenyl | 100 | 300 | Pure Ar gas | 400 | $2 \times 10^4$ |
| (5) | Dibenzyl | 200 | 20 | Pure N gas | 70 | $2 \times 10^4$ |
| (6) | Dibenzyl | 200 | 60 | Pure N gas | 180 | $5 \times 10^4$ |
| (7) | Dibenzyl | 200 | 180 | Pure N gas | 400 | $5 \times 10^4$ |
| Comparative Examples | | | | | | |
| (1) | Ethylene | 100 | 120 | Pure Ar gas | 200 | $5 \times 10^3$ |
| (2) | Stylene | 100 | 120 | Pure Ar gas | 200 | $5 \times 10^3$ |

As can be seen from Table 1, it was demonstrated that when the sublimating organic compound which exhibited a solid phase at room temperature and under atmospheric pressure was used as in examples of the present invention, a resultant magnetic recording medium had a high CSS resistance as compared to a case wherein an gas or liquid-phase organic compound was used as in the comparative examples.

(2) Description of the Inventions and Embodiment Associated with Method of Manufacturing Magnetic Recording Medium (A) The characteristic feature of the present invention is a method of causing the protective film obtained by plasma polymerization described above to be further subjected to a heat treatment. With this method, the resultant film can have a stronger structure, and a smoother surface, and the durability and wear-resistance particularly coefficient of friction can still be improved.

A heating method can be any method that can transfer heat energy to the protective film, such as resistance heating, RF heating, laser heating, infrared heating, and the like. An atmosphere during heating can be vacuum or inert gas, or the outer atmosphere.

In addition, a reactive medium atmosphere may be adopted as an atmosphere during heating, thereby still improving characteristics of the protective film.

As the reaction medium atmosphere, an atmosphere containing any one or a plurality of oxygen, hydrogen, nitrogen, can be used.

In any atmosphere described above, a heating temperature falls within the range of 50° to 300° C. and, more preferably, 80° to 250° C. If the heating temperature is too low, the film structure and its surface property cannot be improved. If the heating temperature is too high, the protective film and the thin ferro-magnetic metal film are badly influenced.

When the protective film is so heated as to change its film structure, the film thickness is also changed accordingly. For the improvement of the film structure a heat treatment is preferably performed to cause the ratio of change in film thickness to fall within the range of ±20%.

A heat treatment time is short if the heating temperature is high. If the heating temperature is low, the heat treatment time is set to be long. Normally, the heat treatment time falls within the range of 10 seconds to 120 minutes.

Examples according to the method of the present invention will now be described.

The disk of Sample No. 6 in Table 1 was subjected to a heat treatment under the conditions shown in Table 2, and the performance of the protective film was tested. Table 2 shows the test results.

TABLE 2

| Sample No. | Atmosphere | Heat Treatment Temperature (°C.) | Heat Treatment Time (min) | CSS Resistance (cycle) | Presence/Absence of Damage of Protective Film | Coefficient of Friction* |
| --- | --- | --- | --- | --- | --- | --- |
| Examples | | | | | | |
| (8) | Air | 130 | 10 | $5 \times 10^4$ or more | Absent | 0.23 |
| (9) | Air | 130 | 20 | $5 \times 10^4$ or more | Absent | 0.20 |
| (10) | Air | 230 | 10 | $5 \times 10^4$ or more | Absent | 0.18 |
| (11) | Oxygen | 50 | 20 | $6 \times 10^4$ or more | Absent | 0.19 |
| (12) | Oxygen | 150 | 5 | $6 \times 10^4$ or more | Absent | 0.20 |
| (13) | Oxygen | 200 | 5 | $6 \times 10^4$ or more | Absent | 0.17 |
| (14) | Tetraethylene fluoride | 110 | 10 | $5 \times 10^4$ or more | Absent | 0.22 |
| Comparative Example | | | | | | |
| (3) | — | — | — | $5 \times 10^4$ | Absent | 0.39 |

*The wear coefficient was measured at 100 rpm of the sample disk.

Note that Comparative Example 3 was not subjected to a heat treatment (Sample No. 6 in Table 1).

(B) In another method of manufacturing a magnetic recording medium according to the present invention, a thin ferro-magnetic metal film is formed on a substrate, a sublimating organic compound which exhibits a solid phase at room temperature and under atmospheric pressure is evaporated; then, a protective film is formed on the thin ferro-magnetic metal film by plasma polymerization using the evaporated organic compound. In this method, a plasma polymerization film is formed while heating the substrate. With this method, a strong protective film having high strength of adhesion with a thin ferro-magnetic metal film can be formed, and a magnetic recording medium having a small coefficient of friction and good durability can be manufactured.

The heating temperature of a substrate preferably falls within the range of 50° to 300° C. and, more preferably, to 80° to 250° C. although it varies in accordance with the types of organic monomer and reaction conditions. If the heating temperature is below 50° C., a strong and smooth protective film cannot be obtained. If the heating temperature exceeds 300° C., the strength of adhesion with the thin ferro-magnetic metal film becomes low, and the hardness of the protective film is decreased.

The reason why the substrate is heated to a fixed temperature and a sublimating organic compound which exhibits a solid phase at room temperature and under atmospheric pressure is so used as to obtain a protective film having excellent characteristics cannot be clarified in detail. However, when the organic compound at room temperature and under atmospheric pressure is changed into a radical in plasma, becomes attached to the substrate, and is polymerized, the organic compound still receives energy in the form of heat from the substrate. Therefore, it can be considered that this extra heat energy can derive appropriate reaction conditions for the organic compound in accordance with properties such as combination energy, a molecular weight, molecular structure, and the like upon polymerization.

Protective films were prepared by the method of the present invention under the conditions shown in Table 3 using the plasma polymerization apparatus shown in FIG. 1, and the performance of the resultant protective films was tested. Table 3 also shows the test results. Note that comparative Example 4 was not subjected to a heat treatment of a substrate (sample No. 6 in Table 1).

TABLE 3

| Sample No. | Sublimating Organic Compound | Substrate Heating Temperature (°C.) | CSS Resistance (Cycle) | Damage to Protective Film | Peeling Property | Wear Coefficient |
| --- | --- | --- | --- | --- | --- | --- |
| Examples | | | | | | |
| (15) | Dibenzyl | 210 | $5 \times 10^4$ or more | No | No | 0.18 |
| (16) | Dibenzyl | 120 | $5 \times 10^4$ or more | No | No | 0.20 |
| (17) | Diphenyl | 230 | $5 \times 10^4$ or more | No | No | 0.19 |
| (18) | Diphenyl | 100 | $5 \times 10^4$ or more | No | No | 0.22 |
| Comparative Example | | | | | | |
| (4) | Dibenzyl | — | $5 \times 10^4$ | No | No | 0.39 |

(C) In still another method of the present invention, a protective film is formed on a thin ferro-magnetic metal film formed on a substrate by plasma polymerization while heating the substrate to a temperature of 50° to 300° C. in the same manner as in method (B). Thereafter, a heat treatment of the protective film is performed at a temperature of 50° to 300° C., thereby obtaining a magnetic recording medium.

Examples according to this method will be described hereinafter.

Protective films were prepared using the reaction apparatus shown in FIG. 1 under the conditions given in Table 4. As a monomer, dibenzyl was used. The protective film was deposited on a 3.5" diameter magnetic disk (Ni-Cr-Co alloy sputter type thin film recording layer). As a carrier gas, pure argon gas was used. An inner pressure of a bell jar immediately before plasma polymerization was set at 0.1 Torr. The resultant film thicknesses were given by the monomer amount. Evaporation of a monomer was performed by heating a small boat for evaporation to about 80° C. Table 4 also shows the results. As the anti-corrosion properties, time from when the resultant magnetic recording medium was exposed to a 95% RH atmosphere at a temperature of 65° C. until corrosion occurred is shown.

TABLE 4

| | Substrate | Plasma Polymerization | | | Post Heat Treatment | Evaluation | | |
| --- | --- | --- | --- | --- | --- | --- | --- | --- |
| Sample No. | Heating Temperature (°C.) | RF Power (W) | Reaction Time (sec) | Monomer Amount (mg) | Temperature in Oxygen (°C.) × (min) | CSS Resistance (cycle) | Coefficient of Friction | Anti-Corrosion Property* |
| Example | | | | | | | | |
| (19) | 200 | 400 | 25 | 10 | 200 × 5 | $6.2 \times 10^4$ | 0.15 | AAA |
| Comparative Examples | | | | | | | | |
| (5) | — | 400 | 25 | 10 | 200 × 5 | $6.1 \times 10^4$ | 0.16 | AA |
| (6) | 200 | 400 | 25 | 10 | — | $5.1 \times 10^4$ | 0.18 | AA |

TABLE 4-continued

| Sample No. | Substrate Heating Temperature (°C.) | Plasma Polymerization | | | Post Heat Treatment Temperature in Oxygen (°C.) × (min) | Evaluation | | |
|---|---|---|---|---|---|---|---|---|
| | | RF Power (W) | Reaction Time (sec) | Monomer Amount (mg) | | CSS Resistance (cycle) | Coefficient of Friction | Anti-Corrosion Property* |
| (7) | — | 400 | 25 | 10 | — | $5 \times 10^4$ | 0.30 | A |

*The times until corrosion occurred (AAA, 6 months or longer; AA, 4 months or longer; A, one month or longer)

(D) In still another method of the present invention, a sublimating organic compound which exhibits a solid phase at room temperature and under atmospheric pressure is heated and evaporated in a closed chamber in advance, and a protective film is formed while introducing the evaporated organic compound into a plasma polymerization reaction chamber. This method has the following advantage. A monomer can be stably supplied under controlled conditions over a long period of time.

Figure 2:
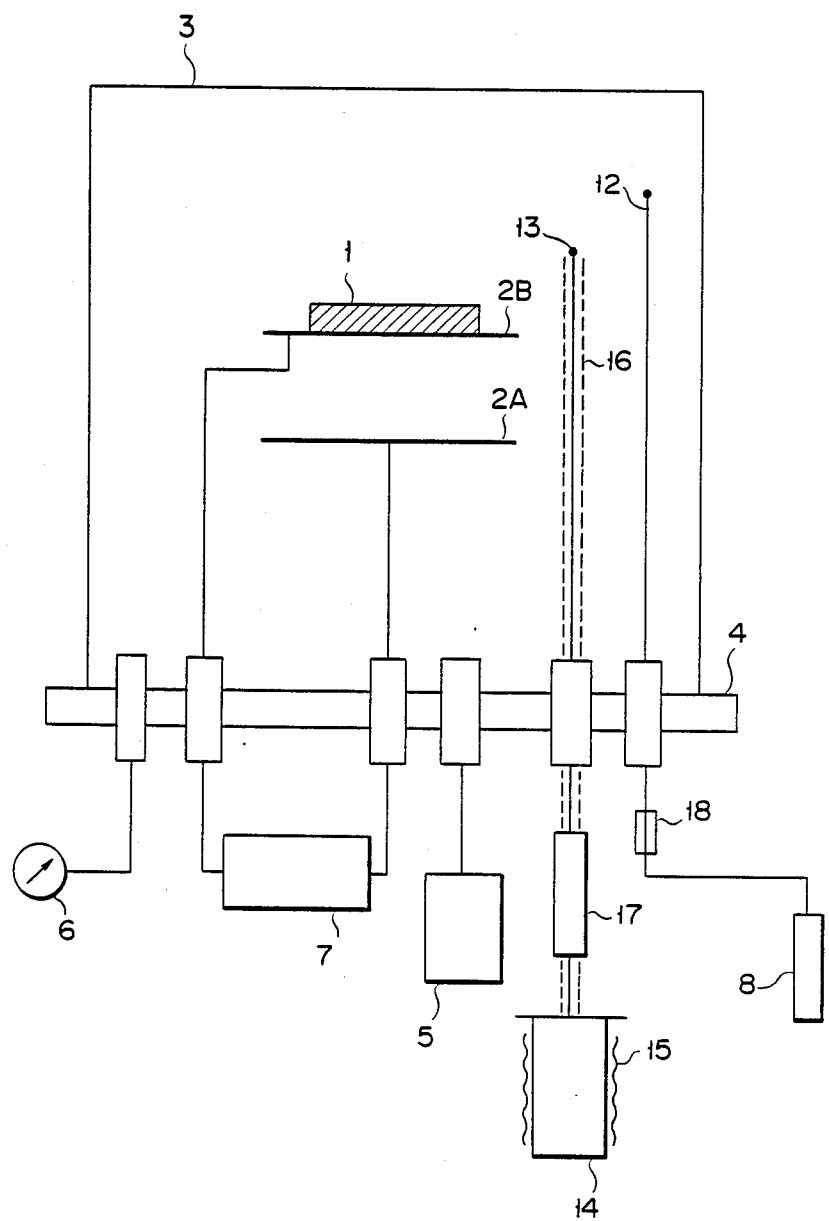

An example according to this method is shown in FIG. 2.

More specifically, referring to FIG. 2, opposing plasma generating flat RF electrodes 2A and 2B having a diameter of 130 mm are arranged in vacuum chamber 3. 5" in diameter hard disk 1 as a magnetic memory disk is placed on the surface of electrode 2B. Monomer supply nozzle 13 and argon supply nozzle 12 for supplying argon gas as a carrier gas are arranged in vacuum chamber 3. The interior of vacuum chamber 3 was evacuated to a vacuum pressure using vacuum pump 5. In FIG. 2, 4 is a table and 6 is an absolute vacuum gauge.

200 g of dibenzyl were sealed in 200-cc stainless chamber 14. Chamber 14 was evacuated to a high vacuum pressure of $10^{-3}$ mmHg so as to obtain an inner pressure of 0.8 kg/cm². Thereafter, heater 15 was mounted on the outer surface of stainless chamber 14 to maintain the temperature of stainless chamber 14 at a temperature of 60°±1° C.

The monomer was sublimated and evaporated, and was supplied from monomer supply nozzle 13 through heating pipe 16 and flow meter 17.

Argon gas 8 was supplied from argon gas supply nozzle 12 at a constant flow rate (20 cc/minute) through a pipe and flow meter 18. RF power source 7 was connected to electrodes 2A and 2B, so that a 200-W plasma output was generated around the electrodes at a frequency of 13.56 MHz.

The protective film obtained by this method can have the same performance as that of the protective film obtained by Sample Nos. 5 to 7 in Table 1 as was aforementioned (a monomer generation source is arranged in a reaction chamber).

What is claimed is:

1. A magnetic recording medium in which a thin ferromagnetic metal film is formed on a substrate to constitute a magnetic recording medium, wherein a protective film, which has a film thickness of 50 to 600 angstroms, is formed on a surface of said thin ferro-magnetic metal film by plasma polymerization of at least one evaporating compound selected from the group consisting of an aliphatic-aromatic hydrocarbon, and a derivative thereof which exhibits a solid phase at room temperature and under atmospheric pressure.

2. A medium according to claim 1, wherein said sublimating organic compound is a diphenyl, diphenylmethane, dibenzyl, triphenylmethane, or terphenyl.

3. A medium according to claim 1, wherein said protective film is a plasma-polymerized film using dibenzyl or diphenyl as said evaporating compound, has a ratio (H/C) of the number of hydrogen atoms to the number of carbon atoms of 0.8 to 1.2, and has a film thickness of 50 to 600 angstroms.

4. In a method of manufacturing a magnetic recording medium in which a protective film is formed on a surface of a magnetic recording layer comprising a thin ferro-magnetic metal film formed on a substrate, the steps of forming said protective film, with a film thickness of 50 to 600 angstroms by plasma polymerization of at least one evaporating compound selected from the group consisting of an aliphatic-aromatic hydrocarbon, and a derivative thereof which exhibits a solid phase at room temperature and under atmospheric pressure, and thereafter, subjecting the resultant magnetic recording medium to a heat treatment.

5. A method according to claim 4, wherein the heat treatment is performed in an outer atmosphere, an inert gas atmosphere, or a vacuum atmosphere at a heating temperature of 50° to 300° C.

6. A method according to claim 4, wherein the heat treatment is performed in a reactive medium atmosphere containing at least one gas selected from the group consisting of oxygen, hydrogen, nitrogen, and the like at a heating temperature of 50° to 300° C.

7. In a method of manufacturing a magnetic recording medium in which a protective film is formed on a surface of a magnetic recording layer comprising a thin ferro-magnetic metal film formed on a substrate, the steps of forming said protective film with a film thickness of 50 to 600 angstroms on a surface of said thin ferro-magnetic metal film while heating said substrate, by plasma polymerization of at least one evaporating compound selected from the group consisting of an aliphatic-aromatic hydrocarbon, and a derivative thereof which exhibits a solid phase at room temperature and under atmospheric pressure.

8. A method according to claim 7, wherein said substrate is heated to a temperature within a range of 50° to 300° C.

9. In a method of manufacturing a magnetic recording medium in which a protective film is formed on a surface of a magnetic recording layer comprising a third ferro-magnetic metal film formed on a substrate, the steps of forming said protective film with a film thickness of 50 to 600 angstroms on a surface of said thn ferro-magnetic film while heating said substrate by plasma polymerization of at least one evaporating compound selected from the group consisting of an aliphatic-aromatic hydrocarbon, and a derivative thereof which exhibits a solid phase at room temperature and under atmospheric pressure, and thereafter, heat treating a resultant magnetic recording medium.

10. In a method for manufacturing a magnetic recording medium in which a protective film is formed on a surface of magnetic recording layer comprising a thin ferro-magnetic metal film formed on a substrate, the steps of forming said protective film with a film thickness of 50 to 600 angstroms on a surface of said thin ferro-magnetic metal film while heating said substrate by plasma polymerization of at least one evaporating compound selected from the group consisting of an aliphatic-aromatic hydrocarbon, and a derivative thereof which exhibits a solid phase at room temperature and under atmospheric pressure and is heated and evaporated in a closed chamber in advance while the evaporated organic compound is introduced into a plasma polymerization chamber.

* * * * *